(12) United States Patent
Shaikh et al.

(10) Patent No.: US 9,411,739 B2
(45) Date of Patent: Aug. 9, 2016

(54) SYSTEM, METHOD AND APPARATUS FOR IMPROVING TRANSACTIONAL MEMORY (TM) THROUGHPUT USING TM REGION INDICATORS

(71) Applicant: Intel Corporation, Santa Clara, CA (US)

(72) Inventors: Omar M. Shaikh, Portland, OR (US); Ravi Rajwar, Portland, OR (US); Paul Caprioli, Hillsboro, OR (US); Muawya M. Al-Otoom, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 118 days.

(21) Appl. No.: 13/691,218

(22) Filed: Nov. 30, 2012

(65) Prior Publication Data
US 2014/0156933 A1     Jun. 5, 2014

(51) Int. Cl.
*G06F 12/08* (2006.01)
*G06F 9/46* (2006.01)
*G06F 9/38* (2006.01)

(52) U.S. Cl.
CPC .......... *G06F 12/0875* (2013.01); *G06F 9/3842* (2013.01); *G06F 9/3855* (2013.01); *G06F 9/3857* (2013.01); *G06F 9/3863* (2013.01); *G06F 9/467* (2013.01); *G06F 2212/452* (2013.01)

(58) Field of Classification Search
CPC ................................ G06F 9/467; G06F 9/528
See application file for complete search history.

(56) References Cited

U.S. PATENT DOCUMENTS

| | | | |
|---|---|---|---|
| 8,180,977 B2 | 5/2012 | Rajwar et al. | |
| 8,479,053 B2 | 7/2013 | Rajwar et al. | |
| 8,549,354 B2 | 10/2013 | Chen et al. | |
| 8,627,017 B2 | 1/2014 | Sheaffer et al. | |
| 2007/0260942 A1* | 11/2007 | Rajwar et al. | 714/54 |
| 2008/0065864 A1* | 3/2008 | Akkary et al. | 712/225 |
| 2008/0244544 A1* | 10/2008 | Neelakantam et al. | 717/147 |
| 2011/0208921 A1 | 8/2011 | Pohlack et al. | |

OTHER PUBLICATIONS

Int'l Preliminary Report and Written Opinion from the Int'l Bureau for PCT Application No. PCT/US2013/045982, mailed Jun. 11, 2015, 8 pages.

* cited by examiner

*Primary Examiner* — Tuan Thai
*Assistant Examiner* — Glenn Gossage
(74) *Attorney, Agent, or Firm* — Nicholson De Vos Webster & Elliott LLP

(57) ABSTRACT

Systems, apparatuses, and methods for improving transactional memory (TM) throughput using a TM region indicator (or color) are described. Through the use of TM region indicators younger TM regions can have their instructions retired while waiting for older TM regions to commit. A copy-on-write (COW) buffer may be used to maintain a mapping from checkpointed architectural registers to physical registers, wherein the COW buffer maintains a plurality of register checkpoints for a plurality of TM regions by marking separations between TM regions using pointers, a first pointer to identify a position in the COW buffer of the last committed instruction, a retirement pointer to identify a boundary between a youngest TM region and a currently retiring position.

19 Claims, 15 Drawing Sheets

| W | R0 | R1 | R2 | tag | data |
|---|---|---|---|---|---|
| | | | | | |
| | | | | | |
| | | | | | |
| | | | | | |
| | | | | | |
| | | | | | |
| | | | | | |
| | | | | | |

Data Cache

FIG. 3

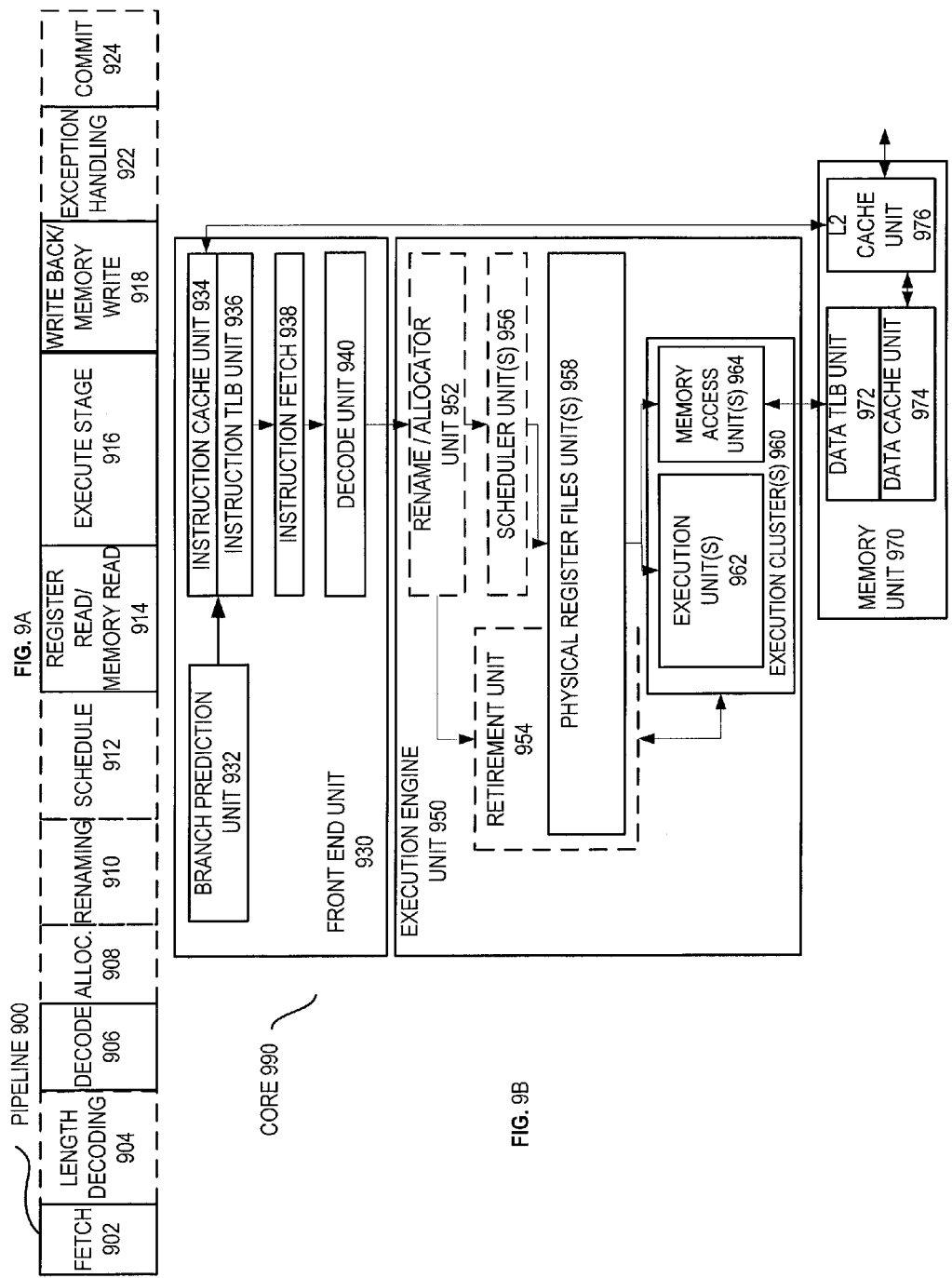

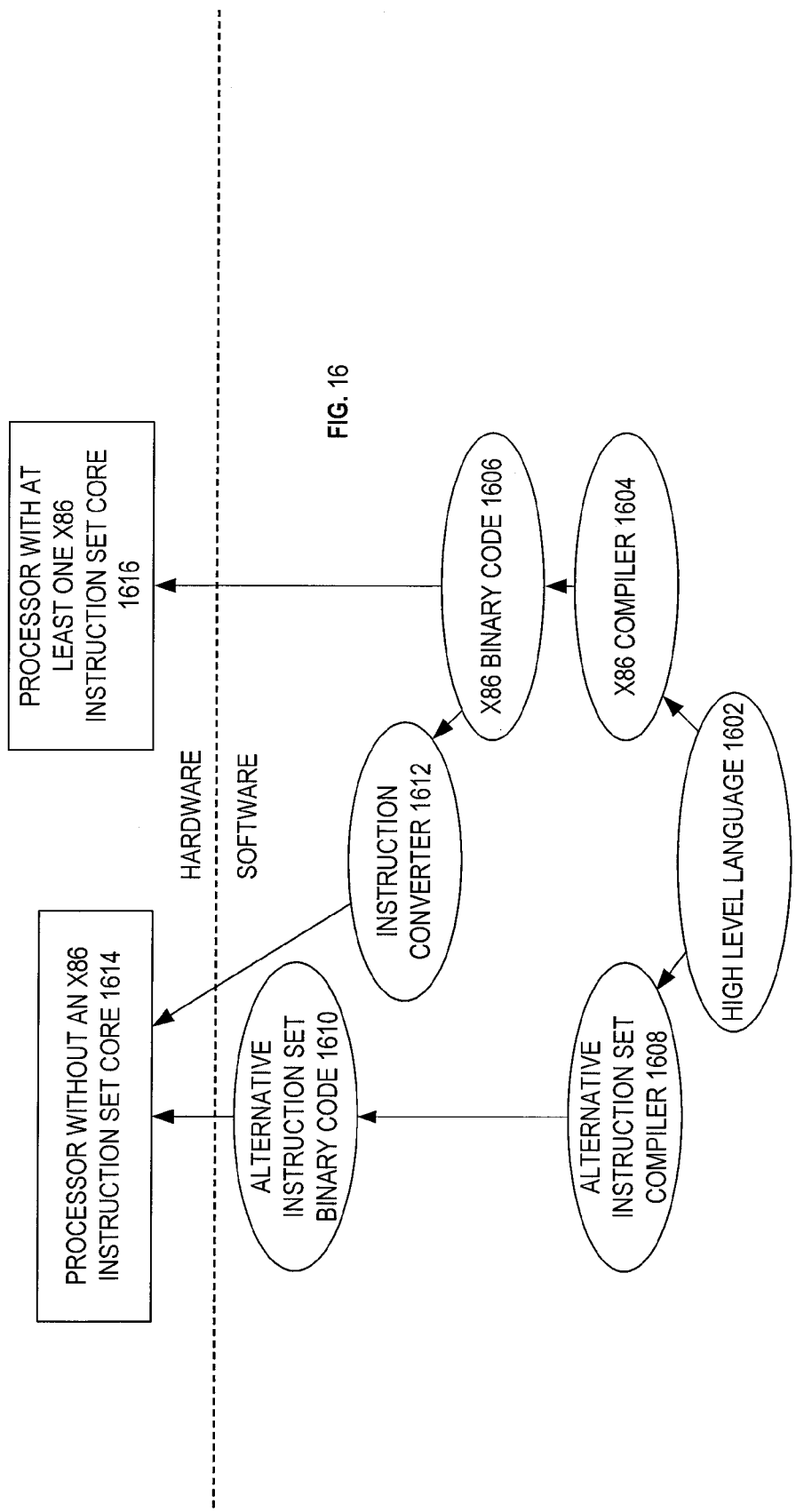

SYSTEM, METHOD AND APPARATUS FOR IMPROVING TRANSACTIONAL MEMORY (TM) THROUGHPUT USING TM REGION INDICATORS

BACKGROUND

A natural implementation of transactional memory ("TM") is to require an older transaction to commit before retiring instructions that are part of a younger transaction. However, in an out-of-order processor it is often the case that a significant number of operations in a younger transaction have finished executing while waiting for the older transaction to commit. For example, a single store in the older transaction may require hundreds of cycles waiting for memory to respond. In the interim, an out-of-order machine could have executed all the instructions in a younger transaction. When the older transaction finally commits, there is now a backlog of instructions to retire from the younger transaction.

BRIEF DESCRIPTION OF THE DRAWINGS

The present invention is illustrated by way of example and not limitation in the figures of the accompanying drawings, in which like references indicate similar elements and in which:

FIG. 3 illustrates an embodiment of a data cache that allows for marking of memory state.

FIG. 9A is a block diagram illustrating both an exemplary in-order pipeline and an exemplary register renaming, out-of-order issue/execution pipeline according to embodiments of the invention.

FIG. 9B is a block diagram illustrating both an exemplary embodiment of an in-order architecture core and an exemplary register renaming, out-of-order issue/execution architecture core to be included in a processor according to embodiments of the invention.

FIG. 10A is a block diagram of a single processor core, along with its connection to the on-die interconnect network and with its local subset of the Level 2 (L2) cache, according to embodiments. FIG. 10B is an expanded view of part of the processor core in FIG. 10A according to embodiments.

FIG. 16 is a block diagram contrasting the use of a software instruction converter to convert binary instructions in a source instruction set to binary instructions in a target instruction set according to embodiments of the invention.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Exemplary Processor Core

Figure 1:
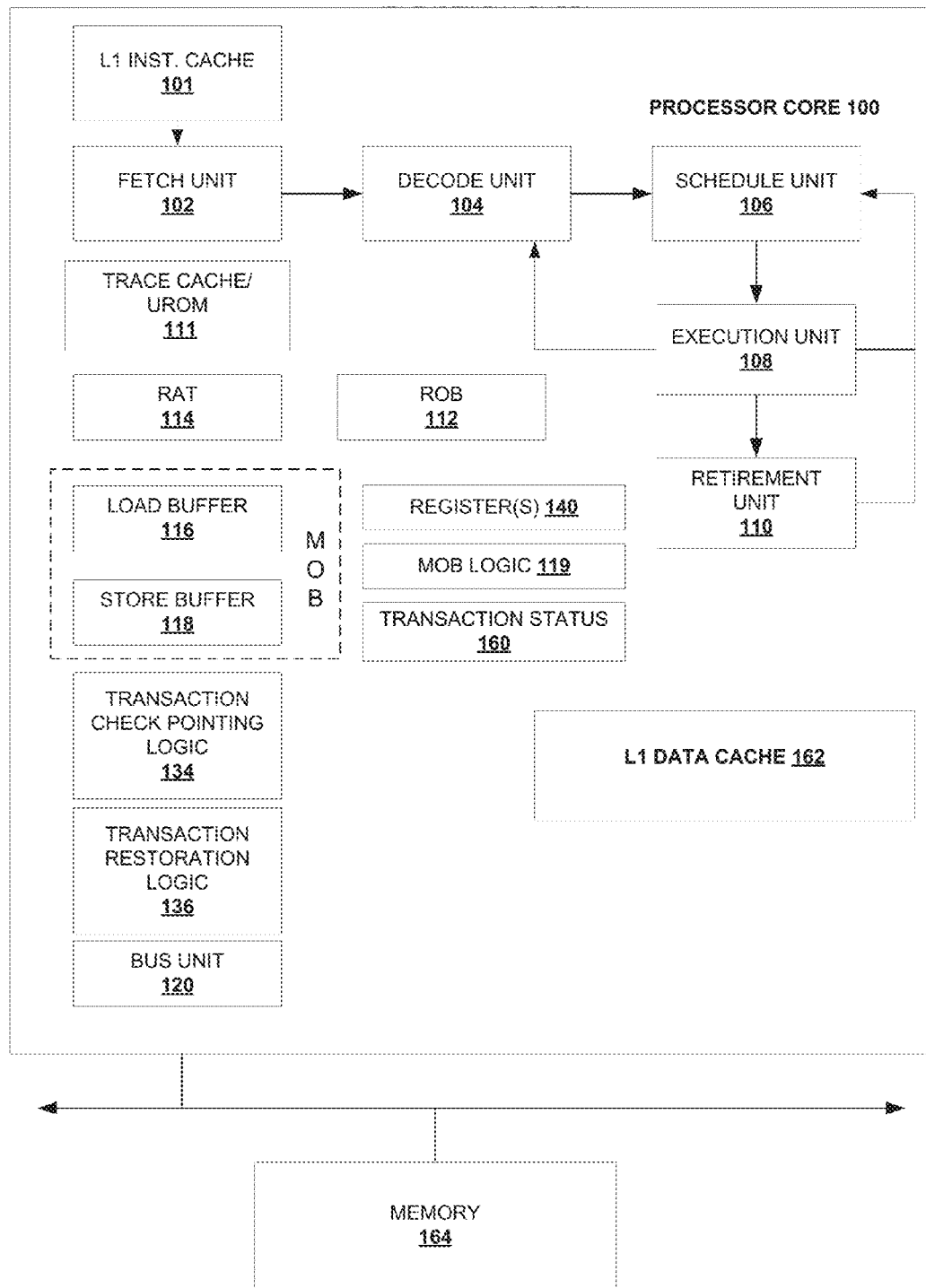
FIG. 1 illustrates a block diagram of portions of a processor core 100, according to an embodiment of the invention.

FIG. 1 illustrates a block diagram of portions of a processor core 100, according to an embodiment of the invention. In one embodiment, the arrows shown in FIG. 1 illustrate the flow of instructions through the core 100. One or more processor cores (such as the processor core 100) may be implemented on a single integrated circuit chip (or die) such as discussed with reference to FIG. 1. Moreover, the chip may include one or more shared and/or private caches (e.g., cache), interconnections, memory controllers, or other components. In an embodiment, the processor core 100 shown in FIG. 1 may be utilized to execute one or more types of threads including those that correspond to a virtualized transaction mode, a non-virtualized (or restricted) transaction mode, and a non-transaction mode.

As illustrated in FIG. 1, the processor core 100 may include a fetch unit 102 to fetch instructions from an instruction cache 101 for execution by the core 100. The instructions may be fetched from L1 instruction cache 101 or any storage device such as memory 164 and/or memory devices. The core 100 may also include a decode unit 104 to decode the fetched instruction. For instance, the decode unit 104 may decode the fetched instruction into a plurality of uops (micro-operations). Additionally, the core 100 may include a schedule unit 106. The schedule unit 106 may perform various operations associated with storing decoded instructions (e.g., received from the decode unit 104) until the instructions are ready for dispatch, e.g., until all source values of a decoded instruction become available. In one embodiment, the schedule unit 106 may schedule and/or issue (or dispatch) decoded instructions to an execution unit 108 for execution. The execution unit 108 may execute the dispatched instructions after they are decoded (e.g., by the decode unit 104) and dispatched (e.g., by the schedule unit 106). In an embodiment, the execution unit 108 may include more than one execution unit, such as a memory execution unit, an integer execution unit, a floating-point execution unit, or other execution units. Further, the execution unit 108 may execute instructions out-of-order. Hence, the processor core 100 may be an out-of-order processor core in one embodiment. The core 100 may also include a retirement unit 110. The retirement unit 110 may retire executed instructions after they are committed. In an embodiment, retirement of the executed instructions may result in processor state being committed from the execution of the instructions, physical registers used by the instructions being de-allocated, etc.

As illustrated in FIG. 1, the core 100 may additionally include a trace cache or microcode read-only memory (uROM) 111 to store microcode and/or traces of instructions that have been fetched (e.g., by the fetch unit 102). The microcode stored in the uROM 111 may be used to configure various hardware components of the core 100. In an embodiment, the microcode stored in the uROM 111 may be loaded from another component in communication with the processor core 100, such as a computer-readable medium or other storage device discussed. The core 100 may also include a reorder buffer (ROB) 112 to store information about in flight instructions (or uops) for access by various components of the processor core 100. The core 100 may further include a RAT (register alias table) 114 to maintain a mapping of logical (or architectural) registers (such as those identified by operands of software instructions) to corresponding physical registers. In one embodiment, each entry in the RAT 114 may include a ROB identifier assigned to each physical register. Additionally, a load buffer 116 and a store buffer 118 (which may be referred to collectively herein as memory order buffer (MOB)) may store pending memory operations that have not loaded or written back to a main memory (e.g., a memory that is external to the processor core 100, such as memory 164), respectively. A MOB logic 119 may perform various operations relating to the buffers 116 and 118 such as discussed herein. Furthermore, the processor core 100 may include a bus unit 120 to allow communication between components of the processor core 100 and other components via one or more buses. One or more fill buffers may temporarily store data that is received (e.g., over the buses) from the memory 164 prior to storing the received data into the L1 data cache 162.

In one embodiment, one or more transaction status registers 160 may be included in the core 100. Each transaction status register 160 may correspond to a transaction that is executing on the core 100. A first transaction may store a value in the transaction status register 160 of a second transaction to indicate that the second transaction is to abort (e.g., due to a higher priority assigned to the first transaction than the second transaction, for example, to avoid conflicts). In an embodiment, each transaction may monitor its respective status register 160 to determine whether it should abort. For example, the status register 160 may be used to abort a transaction even in situations where the transaction may be suspended, e.g., switched out of the core (100) temporarily. This may allow other transactions to proceed without having to wait for an explicit abort. Also, the status registers 160 may be implemented in memory (e.g., within the cache 162 and/or memory 164), instead of a hardware register.

The following discussion with detail embodiments of techniques for improving transactional memory (TM) throughput using a TM region indicator (or color). The initial discussion will discuss at a high-level the use of TM region indictors and various components that are typically utilized in improving throughput. More specific examples of handling loads and stores of a transaction are detailed after that.

Region Indication

Multiple transactional memory routines from the same thread may run on a processor at a given point in time and are ordered one after the other. These routines are called "regions" throughout this description. In an embodiment, transactions are delineated by begin and end instructions (for example, XBEGIN and XEND). As detailed herein, a TM region indicator is used to distinguish instructions that come from one TM region from those coming from another TM region. This indicator may be assigned to an instruction (either a macro instruction or microoperation) dynamically at many different points in a pipeline or statically prior to runtime. The allocate stage of a pipeline is one point before out-of-order execution at which instructions are still seen in order and therefore would provide an opportune time to tag an instruction with its TM region indicator. During this stage, a decision is made as to what storage location is to be used (such as a position in the load or store buffer of a MOB), an assignment of a physical register for use by the instruction (this may include register renaming), and which functional unit to use (if necessary). However, other stages such as fetch, decode, etc. may be also utilized. Regardless of which stage is used for TM region indicator tagging, TM region indicator information is placed into the reordering buffer (ROB) 112.

An example of a TM region indicator using "n" as the number of consecutive transactional memory regions from which instructions are allowed to retire is detailed herein. For example, when n=3 instructions from the first TM region are assigned color 0; the next region's instructions are assigned color 1; the next region color 2; and the next region color 0; and so forth. As such, the TM region indication assignment stage (such as allocate) does not block instructions from TMs, but simply assigns TM region colors in a round-robin fashion. For timing reasons, an implementation may choose to duplicate the color information elsewhere in the pipeline. For example, load buffer entries may be tagged with their color to facilitate setting the correct (associated) read-bit (R-bit) in the data-cache (D-cache), etc. as will be discussed later.

Checkpointing for Rollback

TM requires a method for checkpointing registers so that register state may be restored in the event that a transaction is aborted. In a processor in which architectural registers are renamed to physical registers, this can be done by retaining the pre-transactional value of an architectural register in its physical register and assigning a new physical register to an instruction within the TM region that overwrites it. Typically, a transaction cannot free physical registers for use by other instructions including those within other transactions. The structure that maintains the mapping from checkpointed architectural registers to physical registers is called the copy-on-write (COW) buffer. In some embodiments, the COW is a part of the retirement unit 110.

Figure 2:
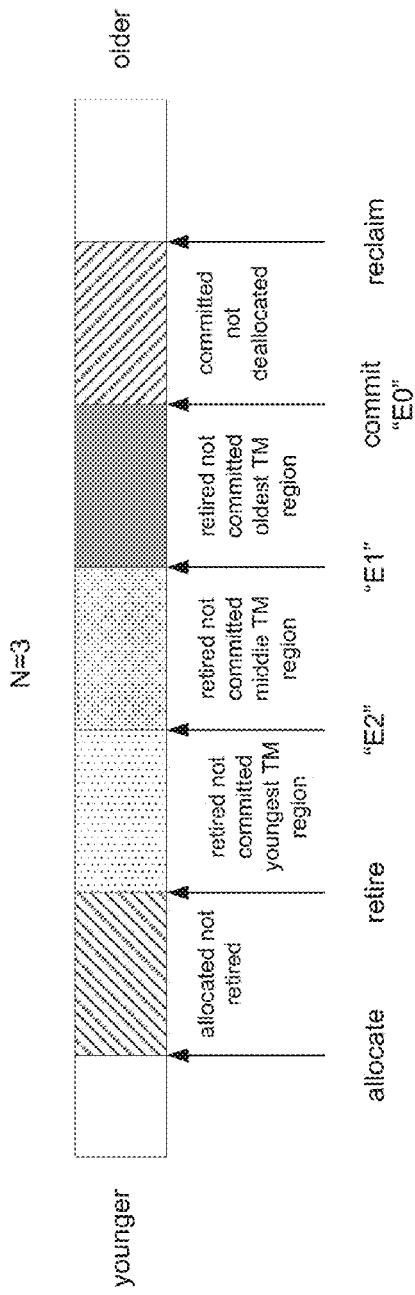
FIG. 2 illustrates an embodiment of a Copy-on-Write (COW) buffer.

In order to support the ability to maintain multiple register checkpoints the COW structure may be used with the addition of intermediate pointers marking the separations between TM regions. An exemplary COW is illustrated in FIG. 2. As shown, a COW stores mappings for registers for instructions that have retired (in chronological order), but are not yet committed.

Using the previous n=3 example, there are three TM regions within the illustrated COW. Pointers are shown in the figure and these pointers delineate the TM regions. A first pointer, E0, identifies the position of the last committed instruction in the COW. Note that there are some registers that have been committed, but are not yet deallocated for use by the processor. These registers may be reclaimed at any time.

A second pointer, E1, identifies the boundary between the oldest TM region and the next older TM region. Between the first and second pointers are instructions that have retired, but are not committed for the oldest TM region.

A third pointer, E2, identifies the boundary between the youngest TM region and a middle TM region. Between the third and second pointers are instructions that have retired, but are not committed for a middle TM region. Instructions that have retired, but have not yet reached pointer E2 are from the youngest TM region. Each of the above pointers may be stored within the COW itself or stored in one or more dedicated registers.

The currently retiring instruction has its own pointer, the retirement pointer. When the oldest region commits (or is deemed to be uncommittable), E0 is updated to point to the E1 position, E1 is updated to point to the E2 position, and E2 is updated to point to the retirement pointer. Then, the retirement pointer may advance into the next TM region, etc.

Data Cache

TM requires a method for marking memory state that has been speculatively read so that changes to the state by other execution threads can be detected. These changes by other threads would violate the atomicity of the transaction and so it is necessary to abort the transaction if they occur.

Figure 3:
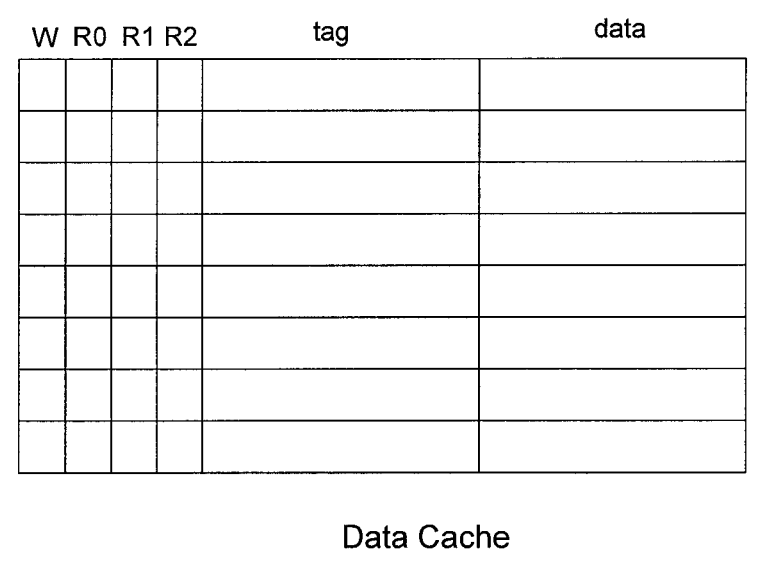

FIG. 3 illustrates an embodiment of a data cache (such as data cache 162) that allows for marking of memory state. In this embodiment, marking is accomplished by adding a single bit per cache line which is called the read-bit (R-bit). The R-bit may be stored in the cache itself or as a separate data structure. When data is speculatively read from the cache line the R-bit is set for that cache line. When the transaction is completed (either by a commit or by an abort) R-bits are cleared.

To support the ability to maintain multiple read-sets (each read set is the set of cache lines read within), a R-bit is provided for each consecutive region from which retirement has been allowed. This is done so that loads from different TM regions may both set their corresponding read-bits without having to stall until the older TM regions commit.

For example, in the n=3 example, there are 3 R-bits, one associated with each color. When a load retires, the R-bit associated with the load's color is marked in the data-cache. When a transaction of a given color commits, the R-bits for that color are cleared. When a transaction of a given color aborts, the R-bits for that color and the R-bits for the colors of any younger transactions are cleared. This is because an aborted transaction implies that all younger transactions must also be aborted.

TM also requires a method for checkpointing memory state so that pre-transactional memory values may be restored in the event that a transaction is aborted. A method to do this involves writing speculative data to the first-level data cache (such as data cache 162) and preventing other execution threads from seeing the speculative data. After a transaction commits the speculative data is made globally visible. On the other hand, should the transaction abort, the speculative data is discarded since the pre-transactional architecturally committed memory values are in lower levels of the cache hierarchy. In order to distinguish cache lines containing speculative data, one bit is added to each data cache line to indicate that the line contains speculatively written data, the write bit (W-bit). Speculative data is written to the cache only after the store instruction is retired (these are known as senior stores). The store's data is maintained in a store buffer (such as in a MOB) prior to its being written to the data cache. Since data is maintained in the store buffer in program order, it is not necessary to add additional W-bits to the data cache. Instead, senior store processing (reading data out of the store buffer for the oldest retired store, writing it to the data cache and setting the W-bit, and removing the entry from the store buffer) may be used such that it only proceeds for the oldest TM region. When the last store of the oldest TM region is processed, senior store processing is halted until the oldest TM region commits. When the region commits, the speculative stores are no longer speculative, and hence are made globally visible. The W bits are cleared, and senior stores from the next TM region (which is now the oldest TM region) can begin processing.

Retirement from ROB

Figure 4:
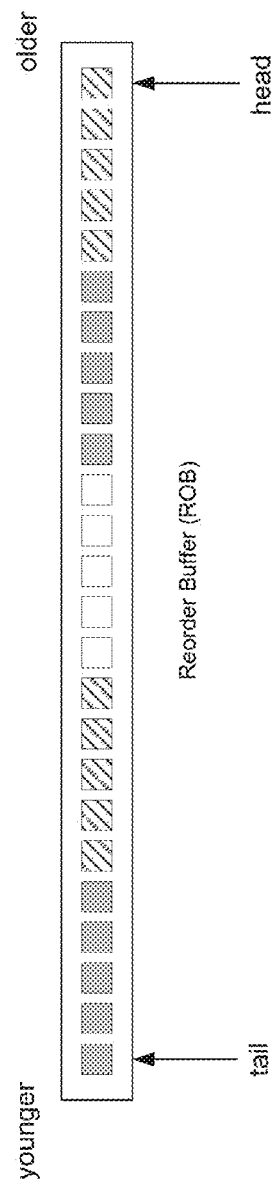
FIG. 4 illustrates an exemplary reorder buffer ROB.

Retirement can now be relaxed such that instructions from "n" TM regions may be retired before having to wait until the oldest TM region is committed. As seen in FIG. 4, more than n TM regions may be present in the ROB at one time. The instructions from these regions have been assigned to one of n colors as detailed above. Retirement may retire the oldest 15 instructions in this example (5 from each of the three regions) instead of having to wait on a per region basis. Retirement stalls before retiring the first instruction of the oldest TM region that is not in an initial grouping from that TM region until the oldest TM region has committed. In this example, the 16th instruction has been assigned the same color as the TM region that is waiting to commit and will be blocked from retirement.

Exemplary Method for Load Instruction Processing of a Transaction

Figure 5:
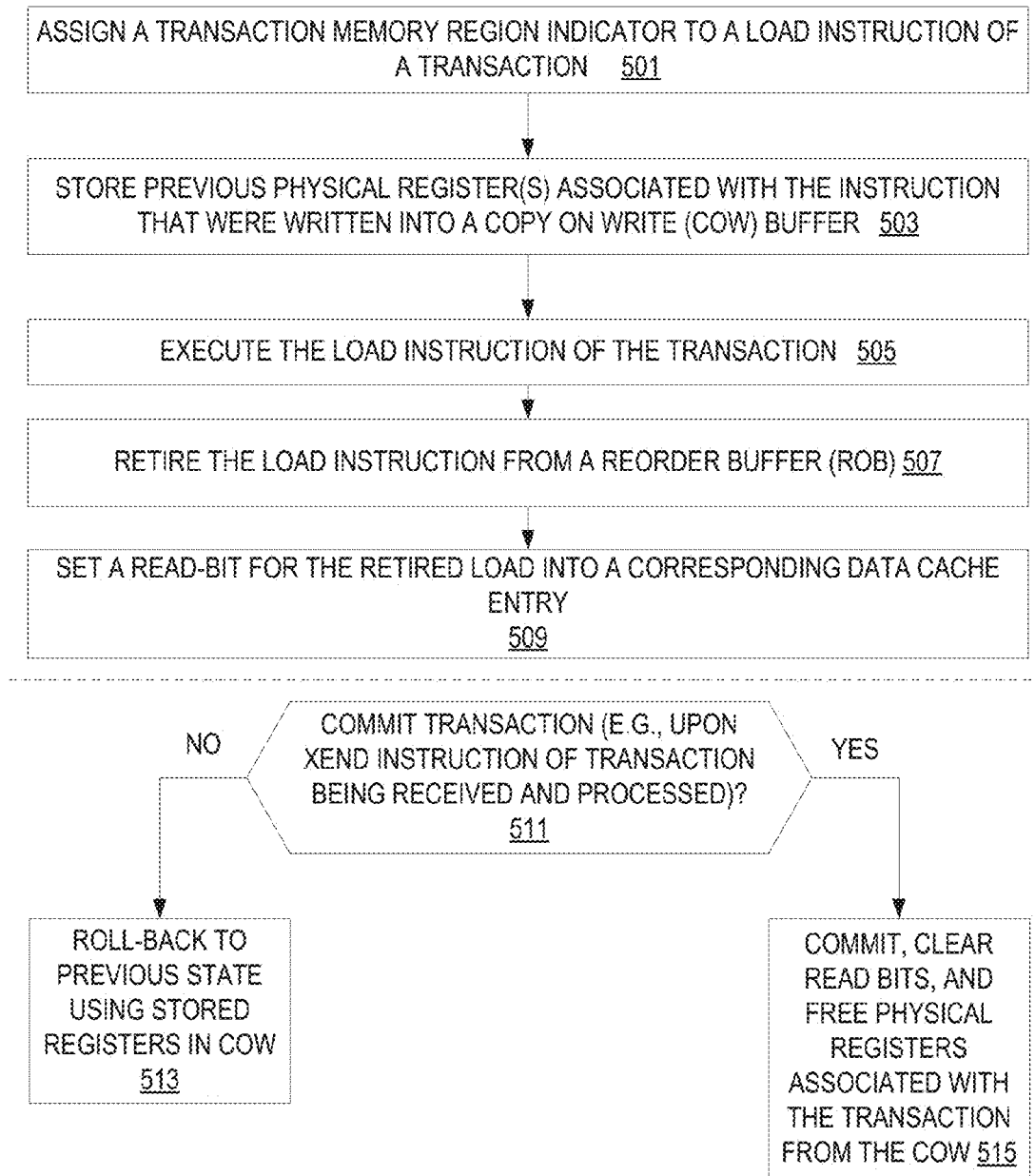
FIG. 5 illustrates an embodiment of using TM region indicators for load instructions.

FIG. 5 illustrates an embodiment of using TM region indicators for load instructions. At 501, a transaction memory region indicator is assigned to a load instruction of that transaction. As noted before, this may occur during an allocation stage of a pipeline by allocation or allocation/rename logic. Additionally, as noted previously, transactions typically begin with a predetermined instruction (such as XBEGIN) and end with a predetermined instruction (such as XEND). This description is from the point of view of a single load instruction, however, it should be understood that each instruction of the transaction would have a region indicator assigned to it.

The previous physical register(s) associated with the instruction that were written into the COW are stored at 503. For example, for the instruction LOAD RAX, (memory location) where RAX had been previously mapped to physical register 17, physical register 17 is stored in the COW and an allocate pointer (described above) is placed into a pointer storage location. Note that the previous mapping of RAX (physical register 17) is stored in the COW because it contains the architectural value of RAX that had been written prior to this TM region. So, if the TM region were to abort, the value for RAX can be properly restored. If multiple instructions within the same TM region all write to RAX, only the first of these needs to preserve the previous mapping in the COW.

The load instruction of the transaction is executed at 505. Of course, because this is an out-of-order machine, other transactions may be following this same course of action.

The load instruction is retired (for example from the ROB) at 507. As noted above, retirement may occur without having to wait until the oldest TM region is committed.

A read-bit is set for the load that has been retired into a corresponding data cache entry at 509. This read-bit corresponds to the color or region indicator that was assigned at 501.

At some later point, a decision is made of whether or not to commit the transaction at 511. Typically, this decision is reached when an XEND instruction is received and processed, and nothing has caused an abort of the transaction. If the transaction is allowed to commit, the R-bits associated with that transaction are cleared and the physical registers associated with the transaction are allowed to be freed from the COW for use by the processor and so the pointers of the COW are moved accordingly at 515. If the transaction is not allowed to commit, then the state is rolled-back to what it was before the transaction by using the stored registers in the COW at 513. An abort may be caused, for example, by another thread having modified data that has been speculatively loaded. These registers are also free to be used by the processor. The read-bits are also cleared in preparation for a possible future transaction.

Exemplary Method for Store Instruction Processing of a Transaction

Figure 6:
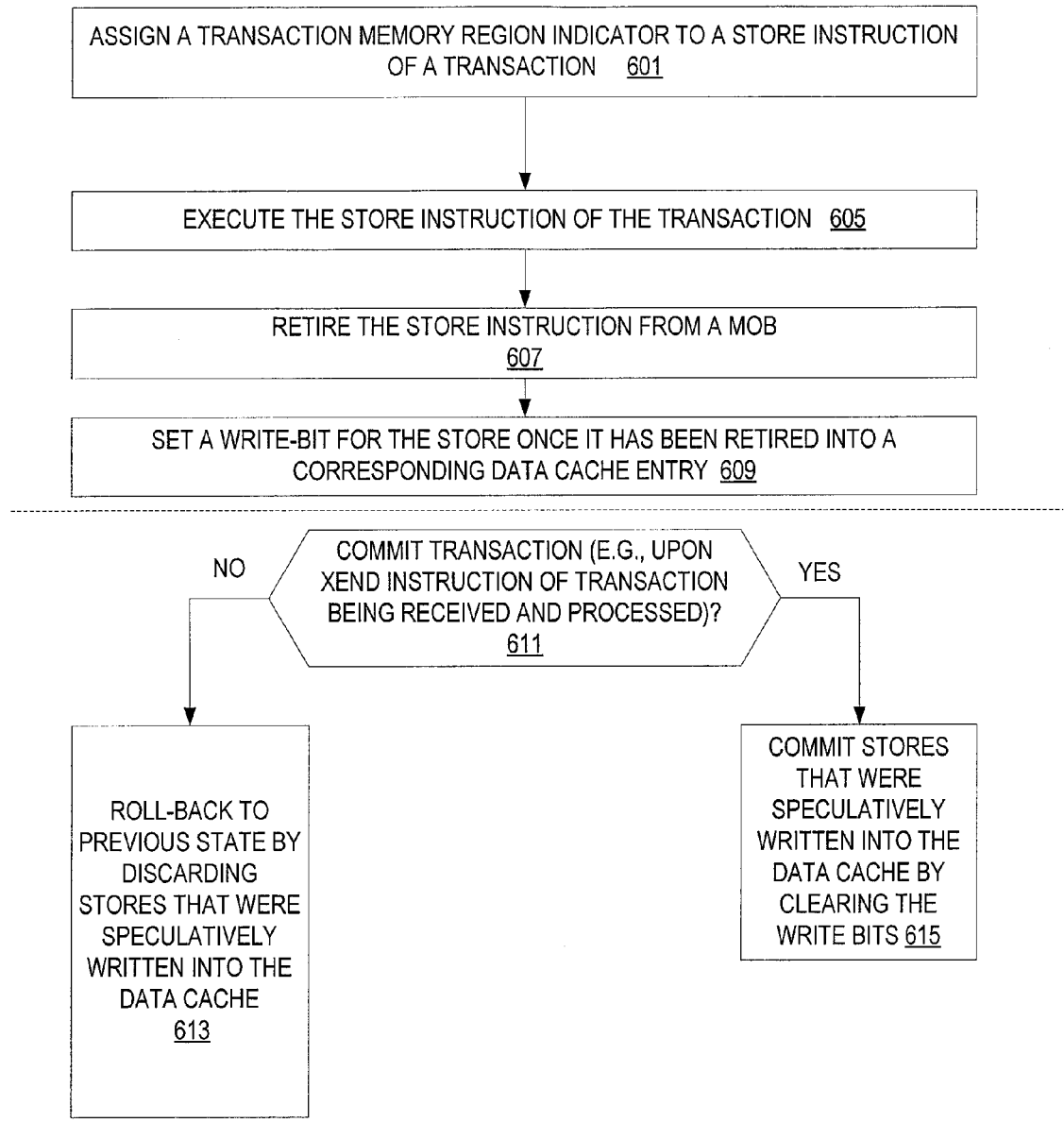
FIG. 6 illustrates an embodiment of using TM region indicators for store instructions.

FIG. 6 illustrates an embodiment of using TM region indicators for store instructions. At 601, a transaction memory region indicator is assigned to a store instruction of that transaction. As noted before, this may occur during an allocation stage of a pipeline by allocation or allocation/rename logic. Additionally, as noted previously, transactions typically begin with a predetermined instruction (such as XBEGIN) and end with a predetermined instruction (such as XEND). This description is from the point of view of a single store instruction, however, it should be understood that each instruction of the transaction would have a region indicator assigned to it.

The store instruction of the transaction is executed at 605. Of course, because this is an out-of-order machine, other transactions may be following this same course of action. At this stage, the instructions are also placed into a store buffer of a MOB if such a mechanism is used in the processor.

The store instruction is retired (for example from the ROB) at 607 for the oldest TM region. As noted above, senior store processing is used for retirement of the oldest TM region by reading data out of the store buffer for the oldest retired store, writing it to the data cache and setting the W-bit, and removing the entry from the store buffer.

A write-bit is set for the store that has been retired into a corresponding data cache entry at 609.

At some later point, a decision is made of whether or not to commit the transaction at 611. Typically, this decision is reached when an XEND instruction is received and processed, and nothing has caused an abort of the transaction. If the transaction is allowed to commit, the W-bits associated with that transaction are cleared, and therefore the stores associated with the transaction that had been speculatively written into the data cache are now committed and hence are made globally visible. Once the oldest TM region commits the next oldest TM region may retire according to senior store processing. If the transaction is not allowed to commit, then the state is rolled-back to what it was before the transaction began. This is done by invalidating all the entries in the data cache that had been speculatively written (as indicated by the write bit having been set for that cache line). The write bits are also cleared in preparation for a possible future transaction. If the transaction is aborted, all in-progress younger transactions are also aborted.

While the above methods have been described as being separate load and store processing, transactions will virtually always have loads and stores. As such, the aspects of the proceeding figures may be mixed together.

Exemplary Method for Arithmetic Instruction Processing of a Transaction

Figure 7:
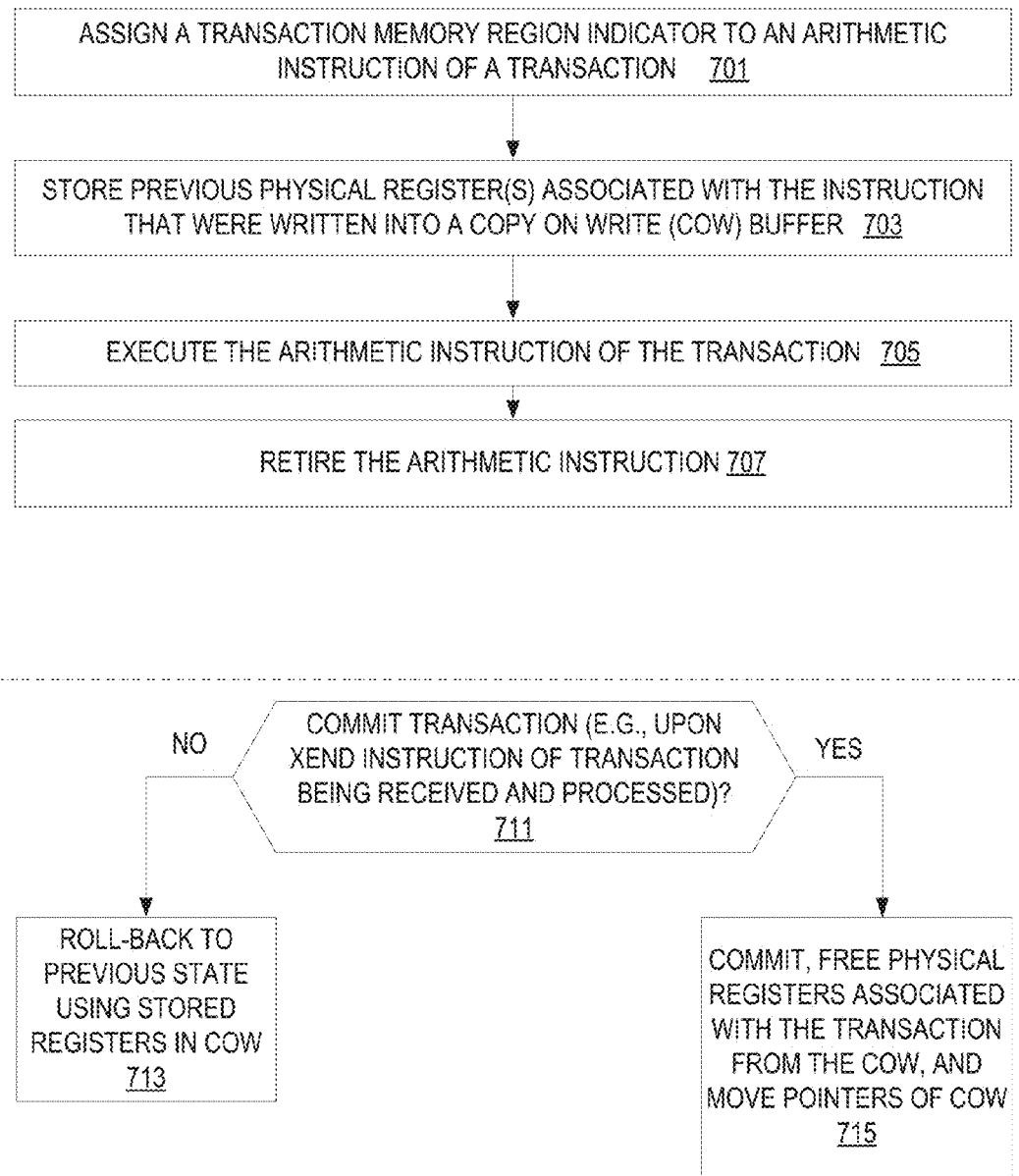
FIG. 7 illustrates an embodiment of using TM region indicators for arithmetic instructions.

FIG. 7 illustrates an embodiment of using TM region indicators for arithmetic instructions. At 701, a transaction memory region indicator is assigned to an arithmetic instruction of that transaction. As noted before, this may occur during an allocation stage of a pipeline by allocation or allocation/rename logic. Additionally, as noted previously, transactions typically begin with a predetermined instruction (such as XBEGIN) and end with a predetermined instruction (such as XEND). This description is from the point of view of a single load instruction, however, it should be understood that each instruction of the transaction would have a region indicator assigned to it.

The previous physical register(s) associated with the instruction that were written into the COW are stored at 703. For example, for the instruction ADD RAX, RAX where RAX had been previously mapped to physical register 17, physical register 17 is stored in the COW and an allocate pointer (described above) is placed into a pointer storage location. Note that the previous mapping of RAX (physical register 17) is stored in the COW because it contains the architectural value of RAX that had been written prior to this TM region. So, if the TM region were to abort, the value for RAX can be properly restored. If multiple instructions within the same TM region all write to RAX, only the first of these needs to preserve the previous mapping in the COW.

The arithmetic instruction of the transaction is executed at 705.

The arithmetic instruction is retired (for example from the ROB) at 707. As noted above, retirement may occur without having to wait until the oldest TM region is committed.

At some later point, a decision is made of whether or not to commit the transaction at 711. Typically, this decision is reached when an XEND instruction is received and processed, and nothing has caused an abort of the transaction. If the transaction is allowed to commit, the physical registers associated with the transaction are allowed to be freed from the COW for use by the processor and so the pointers of the COW are moved accordingly at 715. If the transaction is not allowed to commit, then the state is rolled-back to what it was before the transaction by using the stored registers in the COW at 713. An abort may be caused, for example, by another thread having modified data that has been speculatively loaded. These registers are also free to be used by the processor.

Exemplary Register Architecture

Figure 8:
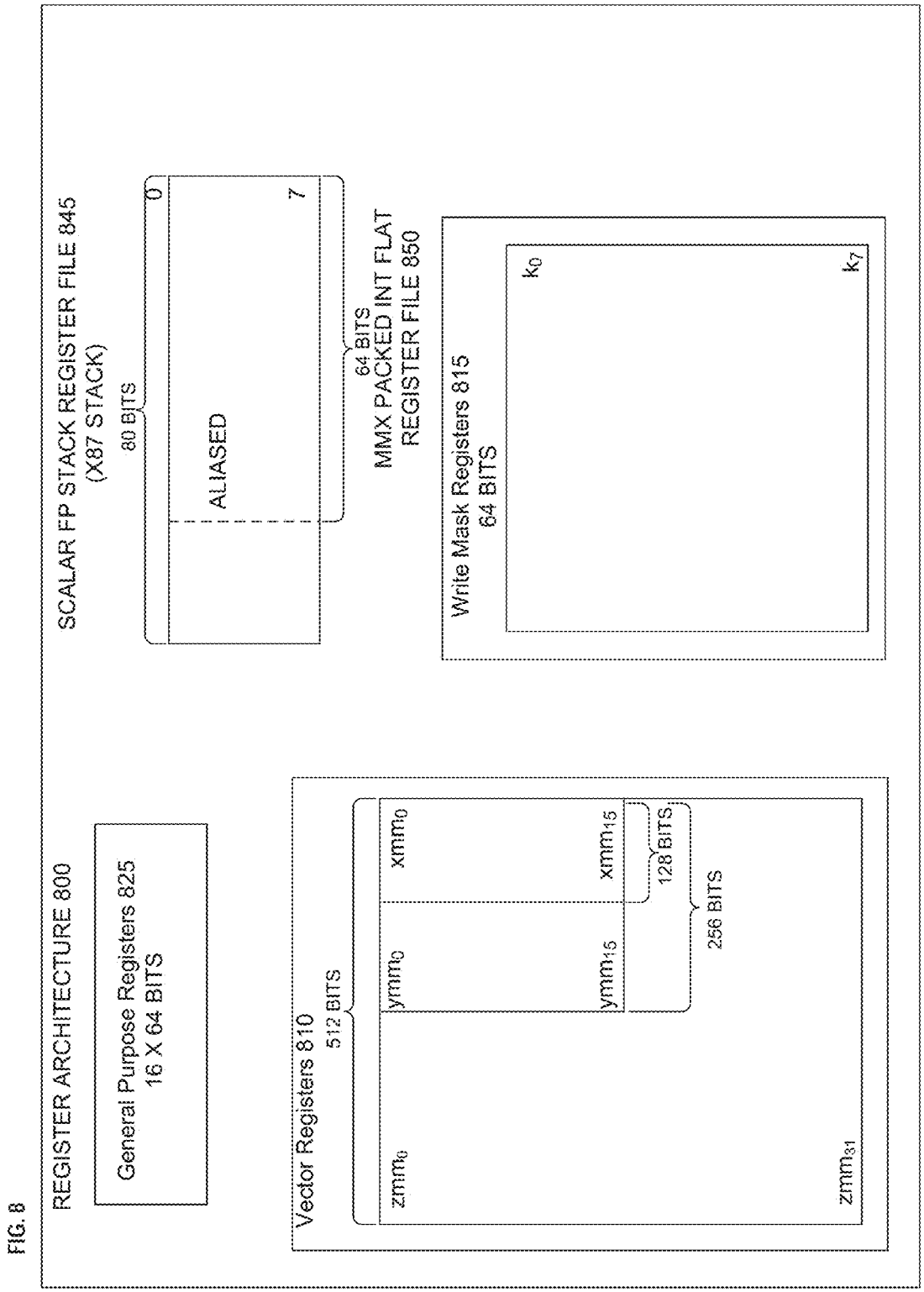
FIG. 8 is a block diagram of a register architecture 800 according to one embodiment of the invention.

FIG. 8 is a block diagram of a register architecture 800 according to one embodiment of the invention. In the embodiment illustrated, there are 32 vector registers 810 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. Write mask registers 815 are referenced as k0-7.

General-purpose registers 825—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 845, on which is aliased the MMX packed integer flat register file 850—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the invention may use wider or narrower registers. Additionally, alternative embodiments of the invention may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a central processing unit (CPU) including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 9A is a block diagram illustrating both an exemplary in-order pipeline and an exemplary register renaming, out-of-order issue/execution pipeline according to embodiments of the invention. FIG. 9B is a block diagram illustrating both an exemplary embodiment of an in-order architecture core and an exemplary register renaming, out-of-order issue/execution architecture core to be included in a processor according to embodiments of the invention. The solid lined boxes in FIGS. 9A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 9A, a processor pipeline 900 includes a fetch stage 902, a length decode stage 904, a decode stage 906, an allocation stage 908, a renaming stage 910, a scheduling (also known as a dispatch or issue) stage 912, a register read/memory read stage 914, an execute stage 916, a write back/memory write stage 918, an exception handling stage 922, and a commit stage 924.

FIG. 9B shows processor core 990 including a front end unit 930 coupled to an execution engine unit 950, and both are coupled to a memory unit 970. The core 990 may be a reduced instruction set computing (RISC) core, a complex instruction set computing (CISC) core, a very long instruction word (VLIW) core, or a hybrid or alternative core type. As yet another option, the core 990 may be a special-purpose core, such as, for example, a network or communication core, compression engine, coprocessor core, general purpose computing graphics processing unit (GPGPU) core, graphics core, or the like.

The front end unit 930 includes a branch prediction unit 932 coupled to an instruction cache unit 934, which is coupled to an instruction translation lookaside buffer (TLB) 936, which is coupled to an instruction fetch unit 938, which is coupled to a decode unit 940. The decode unit 940 (or decoder) may decode instructions, and generate as an output one or more micro-operations, micro-code entry points, microinstructions, other instructions, or other control signals, which are decoded from, or which otherwise reflect, or are derived from, the original instructions. The decode unit 940 may be implemented using various different mechanisms. Examples of suitable mechanisms include, but are not limited to, look-up tables, hardware implementations, programmable logic arrays (PLAs), microcode read only memories (ROMs), etc. In one embodiment, the core 990 includes a microcode ROM or other medium that stores microcode for certain macroinstructions (e.g., in decode unit 940 or otherwise within the front end unit 930). The decode unit 940 is coupled to a rename/allocator unit 952 in the execution engine unit 950.

The execution engine unit 950 includes the rename/allocator unit 952 coupled to a retirement unit 954 and a set of one or more scheduler unit(s) 956. The scheduler unit(s) 956 represents any number of different schedulers, including reservations stations, central instruction window, etc. The scheduler unit(s) 956 is coupled to the physical register file(s) unit(s) 958. Each of the physical register file(s) units 958 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 958 comprises a vector registers unit and a scalar registers unit. These register units may provide architectural vector registers, vector mask registers, and general purpose registers. The physical register file(s) unit(s) 958 is overlapped by the retirement unit 954 to illustrate various ways in which register renaming and out-of-order execution may be implemented (e.g., using a reorder buffer(s) and a retirement register file(s); using a future file(s), a history buffer(s), and a retirement register file(s); using a register map and a pool of registers; etc.). The retirement unit 954 and the physical register file(s) unit(s) 958 are coupled to the execution cluster(s) 960. The execution cluster(s) 960 includes a set of one or more execution units 962 and a set of one or more memory access units 964. The execution units 962 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 956, physical register file(s) unit(s) 958, and execution cluster(s) 960 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 964). It should also be understood that where separate pipelines are used, one or more of these pipelines may be out-of-order issue/execution and the rest in-order.

The set of memory access units 964 is coupled to the memory unit 970, which includes a data TLB unit 972 coupled to a data cache unit 974 coupled to a level 2 (L2) cache unit 976. In one exemplary embodiment, the memory access units 964 may include a load unit, a store address unit, and a store data unit, each of which is coupled to the data TLB unit 972 in the memory unit 970. The instruction cache unit 934 is further coupled to a level 2 (L2) cache unit 976 in the memory unit 970. The L2 cache unit 976 is coupled to one or more other levels of cache and eventually to a main memory.

By way of example, the exemplary register renaming, out-of-order issue/execution core architecture may implement the pipeline 900 as follows: 1) the instruction fetch unit 938 performs the fetch and length decoding stages 902 and 904; 2) the decode unit 940 performs the decode stage 906; 3) the rename/allocator unit 952 performs the allocation stage 908 and renaming stage 910; 4) the scheduler unit(s) 956 performs the schedule stage 912; 5) the physical register file(s) unit(s) 958 and the memory unit 970 perform the register read/memory read stage 914; the execution cluster 960 perform the execute stage 916; 6) the memory unit 970 and the physical register file(s) unit(s) 958 perform the write back/memory write stage 918; 7) various units may be involved in the exception handling stage 922; and 8) the retirement unit 954 and the physical register file(s) unit(s) 958 perform the commit stage 924.

The core 990 may support one or more instruction sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 990 includes logic to support a packed data instruction set extension (e.g., AVX1, AVX2, and/or some form of the generic vector friendly instruction format (U=0 and/or U=1) previously described), thereby allowing the operations used by many multimedia applications to be performed using packed data.

It should be understood that the core may support multi-threading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 934/974 and a shared L2 cache unit 976, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 10B:
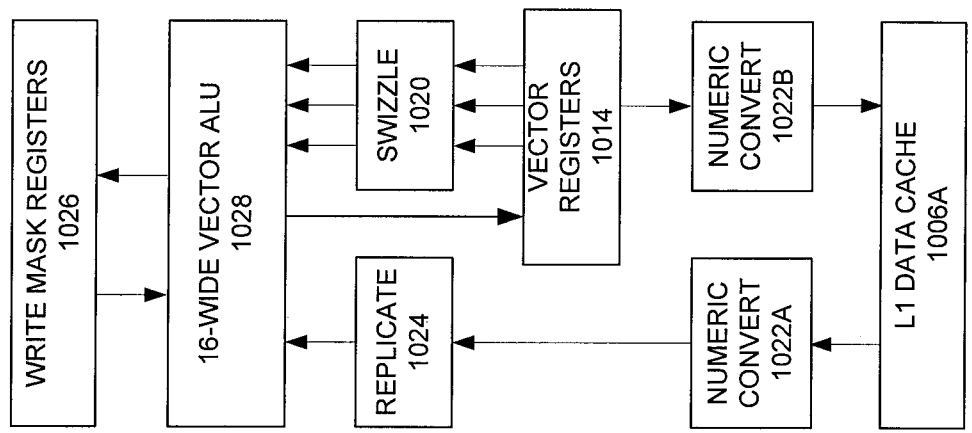
FIGS. 10A-B illustrate a block diagram of a more specific exemplary in-order core architecture, which core would be one of several logic blocks (including other cores of the same type and/or different types) in a chip. In particular.
Figure 10A:
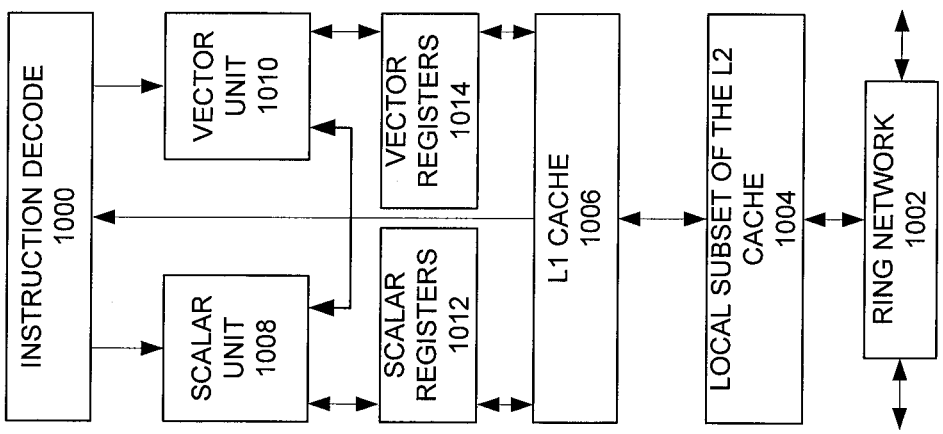

FIGS. 10A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 10A is a block diagram of a single processor core, along with its connection to the on-die interconnect network 1002 and with its local subset of the Level 2 (L2) cache 1004, according to embodiments of the invention. In one embodiment, an instruction decoder 1000 supports the x86 instruction set with a packed data instruction set extension. An L1 cache 1006 allows low-latency accesses to cache memory into the scalar and vector units. While in one embodiment (to simplify the design), a scalar unit 1008 and a vector unit 1010 use separate register sets (respectively, scalar registers 1012 and vector registers 1014) and data transferred between them is written to memory and then read back in from a level 1 (L1) cache 1006, alternative embodiments of the invention may use a different approach (e.g., use a single register set or include a communication path that allows data to be transferred between the two register files without being written and read back).

The local subset of the L2 cache 1004 is part of a global L2 cache that is divided into separate local subsets, one per processor core. Each processor core has a direct access path to its own local subset of the L2 cache 1004. Data read by a processor core is stored in its L2 cache subset 1004 and can be accessed quickly, in parallel with other processor cores accessing their own local L2 cache subsets. Data written by a processor core is stored in its own L2 cache subset 1004 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 10B is an expanded view of part of the processor core in FIG. 10A according to embodiments of the invention. FIG. 10B includes an L1 data cache 1006A part of the L1 cache 1006, as well as more detail regarding the vector unit 1010 and the vector registers 1014. Specifically, the vector unit 1010 is a 16-wide vector processing unit (VPU) (see the 16-wide ALU 1028), which executes one or more of integer, single-precision float, and double-precision float instructions. The VPU supports swizzling the register inputs with swizzle unit 1020, numeric conversion with numeric convert units 1022A-B, and replication with replication unit 1024 on the memory input.

Processor with Integrated Memory Controller and Graphics

Figure 11:
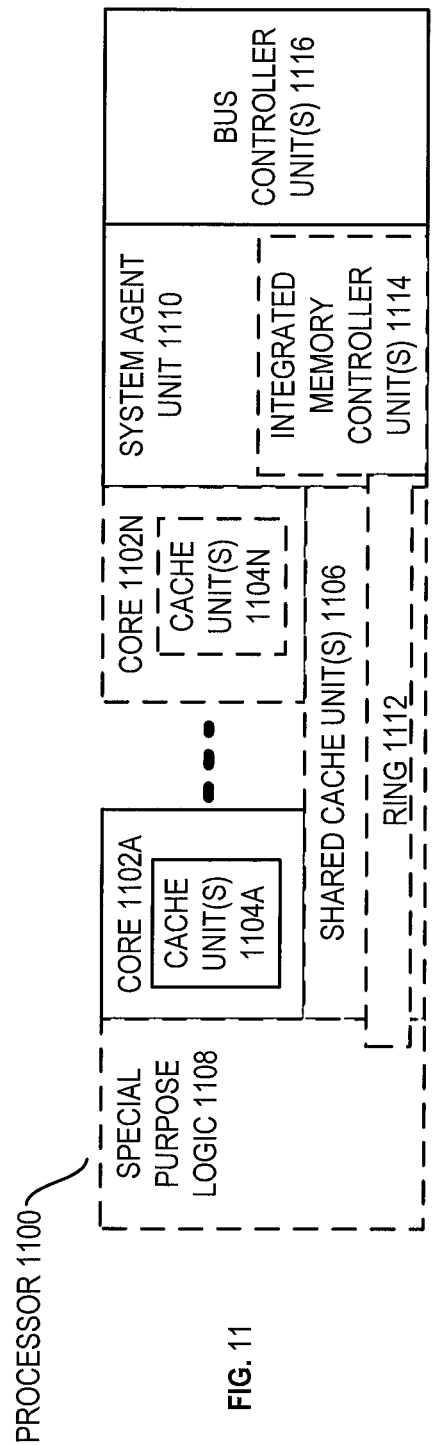
FIG. 11 is a block diagram of a processor 1100 that may have more than one core, may have an integrated memory controller, and may have integrated graphics according to embodiments of the invention.

FIG. 11 is a block diagram of a processor 1100 that may have more than one core, may have an integrated memory controller, and may have integrated graphics according to embodiments of the invention. The solid lined boxes in FIG. 11 illustrate a processor 1100 with a single core 1102A, a system agent 1110, a set of one or more bus controller units 1116, while the optional addition of the dashed lined boxes illustrates an alternative processor 1100 with multiple cores 1102A-N, a set of one or more integrated memory controller unit(s) 1114 in the system agent unit 1110, and special purpose logic 1108.

Thus, different implementations of the processor 1100 may include: 1) a CPU with the special purpose logic 1108 being integrated graphics and/or scientific (throughput) logic (which may include one or more cores), and the cores 1102A-N being one or more general purpose cores (e.g., general purpose in-order cores, general purpose out-of-order cores, a combination of the two); 2) a coprocessor with the cores 1102A-N being a large number of special purpose cores intended primarily for graphics and/or scientific (throughput); and 3) a coprocessor with the cores 1102A-N being a large number of general purpose in-order or out-of-order cores. Thus, the processor 1100 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1100 may be a part of and/or may be implemented on one or more substrates using any of a number of process technologies, such as, for example, BiCMOS, CMOS, or NMOS.

The memory hierarchy includes one or more levels of cache 1104A-N within the cores, a set or one or more shared cache units 1106, and external memory (not shown) coupled to the set of integrated memory controller units 1114. The set of shared cache units 1106 may include one or more mid-level caches, such as level 2 (L2), level 3 (L3), level 4 (L4), or other levels of cache, a last level cache (LLC), and/or combinations thereof. While in one embodiment a ring based interconnect unit 1112 interconnects the integrated graphics-logic 1108 (integrated graphics logic 1108 is an example of and is also referred to herein as special purpose logic), the set of shared cache units 1106, and the system agent unit 1110/integrated memory controller unit(s) 1114, alternative embodiments may use any number of well-known techniques for interconnecting such units. In one embodiment, coherency is maintained between one or more cache units 1106 and cores 1102A-N.

In some embodiments, one or more of the cores 1102A-N are capable of multithreading. The system agent 1110 includes those components coordinating and operating cores 1102A-N. The system agent unit 1110 may include for example a power control unit (PCU) and a display unit. The PCU may be or include logic and components needed for regulating the power state of the cores 1102A-N and the integrated graphics logic 1108. The display unit is for driving one or more externally connected displays.

The cores 1102A-N may be homogenous or heterogeneous in terms of architecture instruction set; that is, two or more of the cores 1102A-N may be capable of executing the same instruction set, while others may be capable of executing only a subset of that instruction set or a different instruction set.

Exemplary Computer Architectures

FIGS. 12-15 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 12:
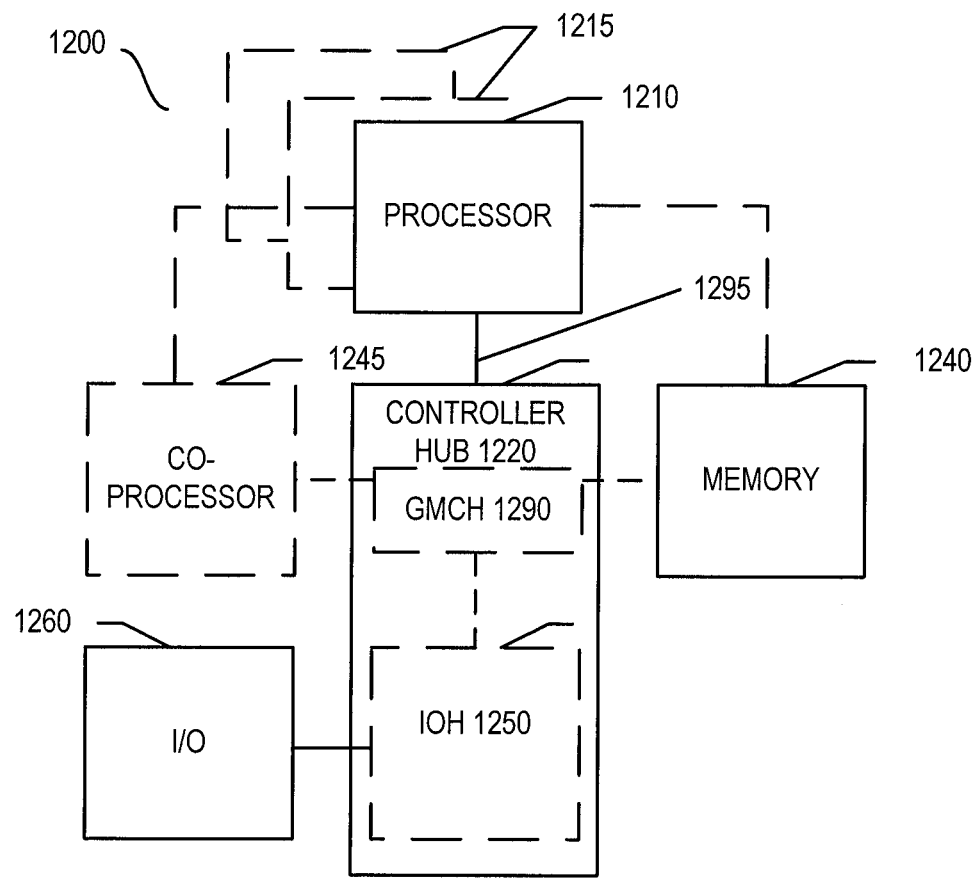
FIGS. 12-15 are block diagrams of exemplary computer architectures.

Referring now to FIG. 12, shown is a block diagram of a system 1200 in accordance with one embodiment of the present invention. The system 1200 may include one or more processors 1210, 1215, which are coupled to a controller hub 1220. In one embodiment the controller hub 1220 includes a graphics memory controller hub (GMCH) 1290 and an Input/Output Hub (IOH) 1250 (which may be on separate chips); the GMCH 1290 includes memory and graphics controllers to which are coupled memory 1240 and a coprocessor 1245; the IOH 1250 couples input/output (I/O) devices 1260 to the GMCH 1290. Alternatively, one or both of the memory and graphics controllers are integrated within the processor (as described herein), the memory 1240 and the coprocessor 1245 are coupled directly to the processor 1210, and the controller hub 1220 is integrated in a single chip with the IOH 1250.

The optional nature of additional processors 1215 is denoted in FIG. 12 with broken lines. Each processor 1210, 1215 may include one or more of the processing cores described herein and may be some version of the processor 1100.

The memory 1240 may be, for example, dynamic random access memory (DRAM), phase change memory (PCM), or a combination of the two. For at least one embodiment, the controller hub 1220 communicates with the processor(s) 1210, 1215 via a multi-drop bus, such as a frontside bus (FSB), point-to-point interface such as QuickPath Interconnect (QPI), or similar connection 1295.

In one embodiment, the coprocessor 1245 is a special-purpose processor, such as, for example, a high-throughput MIC processor, a network or communication processor, compression engine, graphics processor, GPGPU, embedded processor, or the like. In one embodiment, controller hub 1220 may include an integrated graphics accelerator.

There can be a variety of differences between the physical resources 1210, 1215 in terms of a spectrum of metrics of merit including architectural, microarchitectural, thermal, power consumption characteristics, and the like.

In one embodiment, the processor 1210 executes instructions that control data processing operations of a general type. Embedded within the instructions may be coprocessor instructions. The processor 1210 recognizes these coprocessor instructions as being of a type that should be executed by the attached coprocessor 1245. Accordingly, the processor 1210 issues these coprocessor instructions (or control signals representing coprocessor instructions) on a coprocessor bus or other interconnect, to coprocessor 1245. Coprocessor(s) 1245 accepts and executes the received coprocessor instructions.

Figure 13:
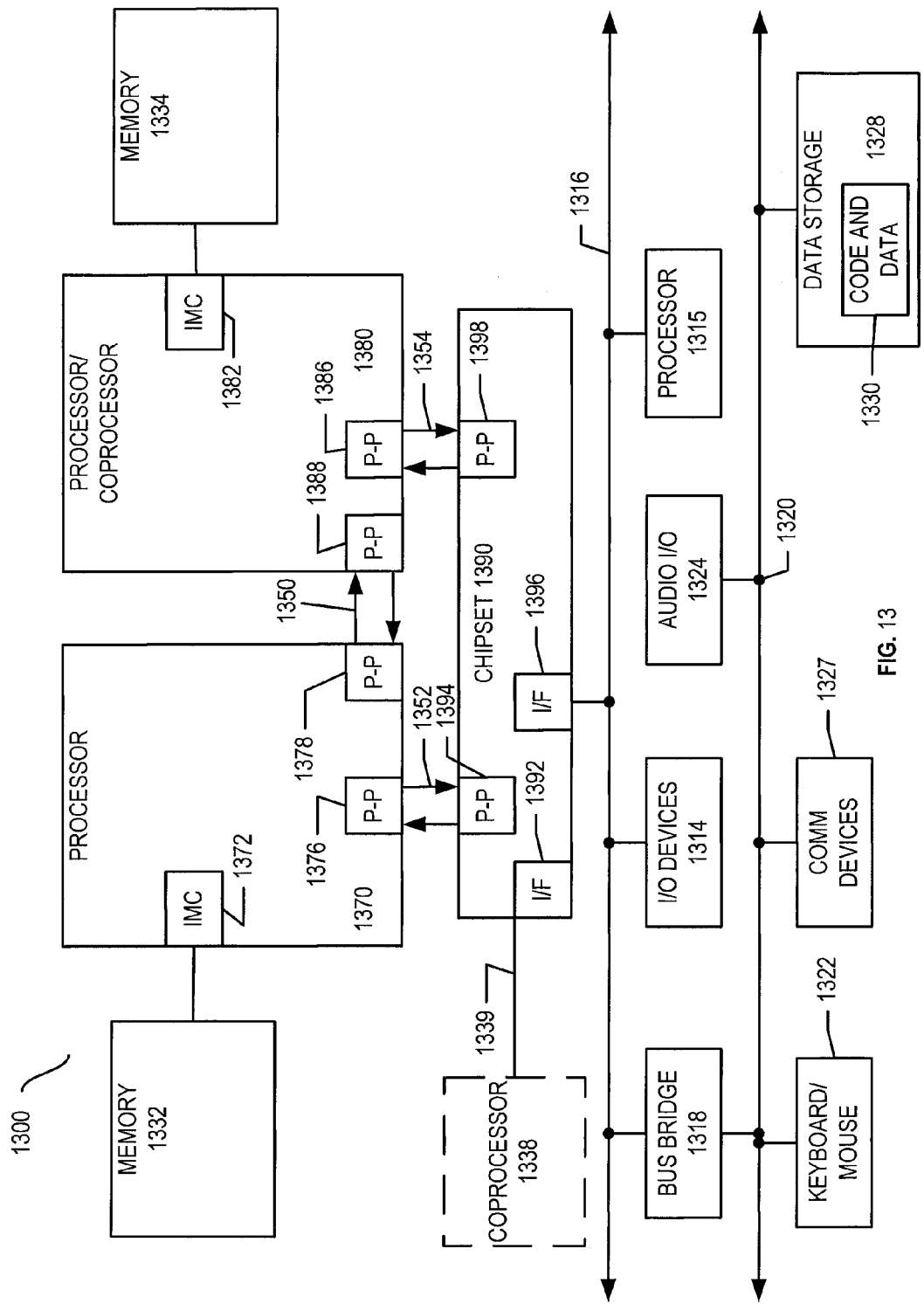

Referring now to FIG. 13, shown is a block diagram of a first more specific exemplary system 1300 in accordance with an embodiment of the present invention. As shown in FIG. 13, multiprocessor system 1300 is a point-to-point interconnect system, and includes a first processor 1370 and a second processor 1380 coupled via a point-to-point interconnect 1350. Each of processors 1370 and 1380 may be some version of the processor 1100. In one embodiment of the invention, processors 1370 and 1380 are respectively processors 1210 and 1215, while coprocessor 1338 is coprocessor 1245. In another embodiment, processors 1370 and 1380 are respectively processor 1210 and coprocessor 1245.

Processors 1370 and 1380 are shown including integrated memory controller (IMC) units 1372 and 1382, respectively. Processor 1370 also includes as part of its bus controller units point-to-point (P-P) interfaces 1376 and 1378; similarly, second processor 1380 includes P-P interfaces 1386 and 1388. Processors 1370, 1380 may exchange information via a point-to-point (P-P) interconnect 1350 using P-P interface circuits 1378, 1388. As shown in FIG. 13, IMCs 1372 and 1382 couple the processors to respective memories, namely a memory 1332 and a memory 1334, which may be portions of main memory locally attached to the respective processors.

Processors 1370, 1380 may each exchange information with a chipset 1390 via individual P-P interfaces 1352, 1354 using point to point interface circuits 1376, 1394, 1386, 1398. Chipset 1390 may optionally exchange information with the coprocessor 1338 via a high-performance interface 1339. In one embodiment, the coprocessor 1338 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1390 may be coupled to a first bus 1316 via an interface 1396. In one embodiment, first bus 1316 may be a Peripheral Component Interconnect (PCI) bus, or a bus such as a PCI Express bus or another third generation I/O interconnect bus, although the scope of the present invention is not so limited.

As shown in FIG. 13, various I/O devices 1314 may be coupled to first bus 1316, along with a bus bridge 1318 which couples first bus 1316 to a second bus 1320. In one embodiment, one or more additional processor(s) 1315, such as coprocessors, high-throughput MIC processors, GPGPU's, accelerators (such as, e.g., graphics accelerators or digital signal processing (DSP) units), field programmable gate arrays, or any other processor, are coupled to first bus 1316. In one embodiment, second bus 1320 may be a low pin count (LPC) bus. Various devices may be coupled to a second bus 1320 including, for example, a keyboard and/or mouse 1322, communication devices 1327 and a data storage unit 1328 such as a disk drive or other mass storage device which may include instructions/code and data 1330, in one embodiment. Further, an audio I/O 1324 may be coupled to the second bus 1320. Note that other architectures are possible. For example, instead of the point-to-point architecture of FIG. 13, a system may implement a multi-drop bus or other such architecture.

Figure 14:
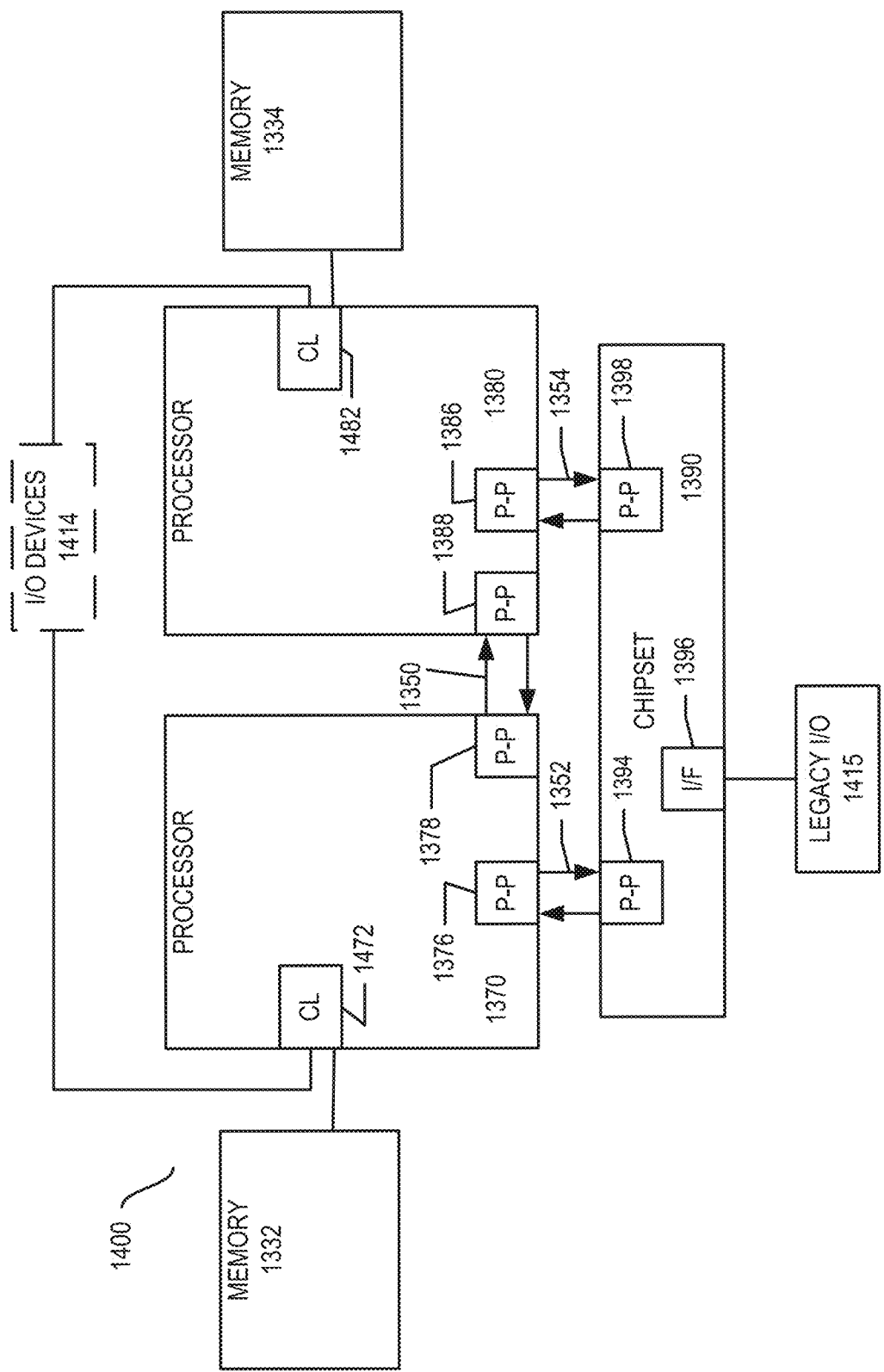

Referring now to FIG. 14, shown is a block diagram of a second more specific exemplary system 1400 in accordance with an embodiment of the present invention. Like elements in FIGS. 13 and 14 bear like reference numerals, and certain aspects of FIG. 13 have been omitted from FIG. 14 in order to avoid obscuring other aspects of FIG. 14.

FIG. 14 illustrates that the processors 1370, 1380 may include integrated memory and I/O control logic ("CL") 1472 and 1482, respectively. Thus, the CL 1472, 1482 include integrated memory controller units and include I/O control logic. FIG. 14 illustrates that not only are the memories 1332, 1334 coupled to the CL 1472, 1482, but also that I/O devices 1414 are also coupled to the control logic 1472, 1482. Legacy I/O devices 1415 are coupled to the chipset 1390.

Figure 15:
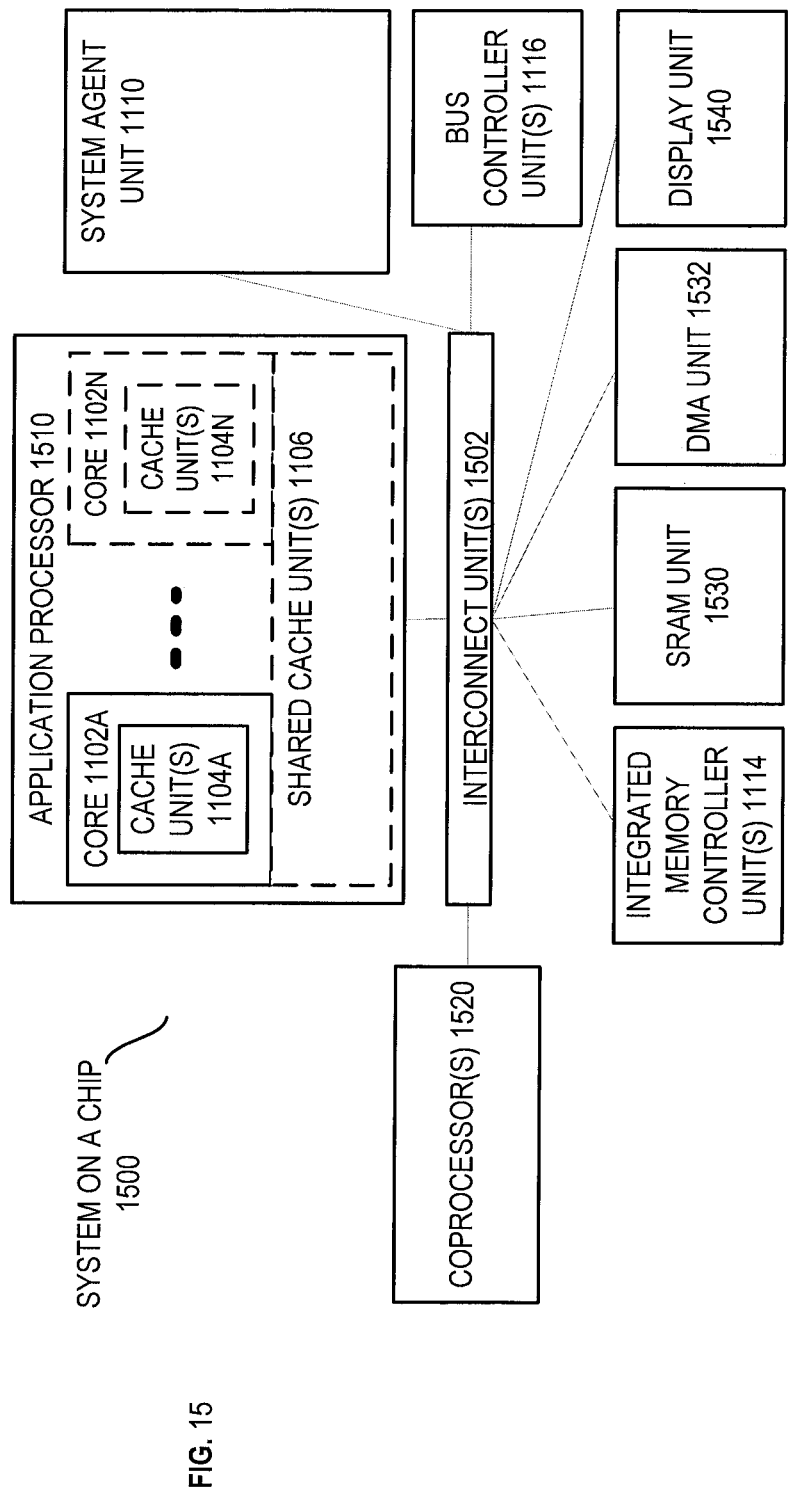

Referring now to FIG. 15, shown is a block diagram of a system on a chip (SoC) 1500 in accordance with an embodiment of the present invention. Similar elements in FIG. 11 bear like reference numerals. Also, dashed lined boxes are optional features on more advanced SoCs. In FIG. 15, an interconnect unit(s) 1502 is coupled to: an application processor 1510 which includes a set of one or more cores 1102A-N and shared cache unit(s) 1106; a system agent unit 1110; a bus controller unit(s) 1116; an integrated memory controller unit(s) 1114; a set or one or more coprocessors 1520 which may include integrated graphics logic, an image processor, an audio processor, and a video processor; a static random access memory (SRAM) unit 1530; a direct memory access (DMA) unit 1532; and a display unit 1540 for coupling to one or more external displays. In one embodiment, the coprocessor(s) 1520 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1330 illustrated in FIG. 13, may be applied to input instructions to perform the functions described herein and generate output information. The output information may be applied to one or more output devices, in known fashion. For purposes of this application, a processing system includes any system that has a processor, such as, for example, a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphine, etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 16 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 16 shows a program in a high level language 1602 may be compiled using an x86 compiler 1604 to generate x86 binary code 1606 that may be natively executed by a processor with at least one x86 instruction set core 1616. The processor with at least one x86 instruction set core 1616 represents any processor that can perform substantially the same functions as an Intel® processor with at least one x86 instruction set core by compatibly executing or otherwise processing (1) a substantial portion of the instruction set of the Intel® x86 instruction set core or (2) object code versions of applications or other software targeted to run on an Intel® processor with at least one x86 instruction set core, in order to achieve substantially the same result as an Intel® processor with at least one x86 instruction set core. The x86 compiler 1604 represents a compiler that is operable to generate x86 binary code 1606 (e.g., object code) that can, with or without additional linkage processing, be executed on the processor with at least one x86 instruction set core 1616. Similarly, FIG. 16 shows the program in the high level language 1602 may be compiled using an alternative instruction set compiler 1608 to generate alternative instruction set binary code 1610 that may be natively executed by a processor without at least one x86 instruction set core 1614 (e.g., a processor with cores that execute the MIPS! instruction set of MIPS Technologies of Sunnyvale, Calif. and/or that execute the ARM! instruction set of ARM Holdings of Sunnyvale, Calif.). The instruction converter 1612 is used to convert the x86 binary code 1606 into code that may be natively executed by the processor without an x86 instruction set core 1614. This converted code is not likely to be the same as the alternative instruction set binary code 1610 because an instruction converter capable of this is difficult to make; however, the converted code will accomplish the general operation and be made up of instructions from the alternative instruction set. Thus, the instruction converter 1612 represents software, firmware, hardware, or a combination thereof that, through emulation, simulation or any other process, allows a processor or other electronic device that does not have an x86 instruction set processor or core to execute the x86 binary code 1606.

What is claimed is:

1. An apparatus comprising:
   logic to assign a transactional memory (TM) region indicator to each instruction of a transaction;
   execution logic to execute each instruction of the transaction;
   a copy-on-write (COW) buffer to maintain a mapping from checkpointed architectural registers to physical registers, wherein the COW buffer to maintain a plurality of register checkpoints for a plurality of TM regions by marking separations between TM regions using pointers, a first pointer to identify a position in the COW buffer of the last committed instruction, a retirement pointer to identify a boundary between a youngest TM region and a currently retiring instruction position;
   a data cache to store data associated with executed instructions, wherein each entry of the data cache has a read-bit per TM region indicator to mark memory state of speculative reads wherein a read-bit for a TM region is set when data is speculatively read from that cache line during that transaction and a write-bit to indicate when the cache line has speculatively written data.

2. The apparatus of claim 1, wherein the logic to assign a transactional memory (TM) region indicator to each instruction of a transaction is allocation logic.

3. The apparatus of claim 1, wherein each of the first, second, and retirement pointers are stored in dedicated registers.

4. The apparatus of claim 1, wherein when the transaction commits, read-bits associated with that transaction are cleared.

5. The apparatus of claim 1, wherein when the transaction aborts, read-bits associated with that transaction are cleared and read-bits for any transaction younger than the transaction are also cleared.

6. The apparatus of claim 1, wherein when the transaction commits, write-bits associated with that transaction are cleared.

7. The apparatus of claim 1, wherein read-bits and write-bits associated with a data cache line are stored in the data cache.

8. A method comprising:
   assigning a transactional memory (TM) region indicator to each instruction of a transaction;
   storing previously used physical registers associated with the transaction into a copy-on-write (COW) buffer, wherein the COW maintains a plurality of register checkpoints for a plurality of TM regions by marking separations between TM regions using pointers, a first pointer to identify a position in the COW of the last committed instruction, and a retirement pointer to identify a boundary between a youngest TM region and a currently retiring position;
   executing the instructions of the transaction;
   retiring one or more oldest load instructions of each TM region from a reorder buffer until a first instruction of an oldest TM region that is not in an initial grouping from that TM region is reached until the oldest TM region has committed; and
setting a read-bit for each load that has been retired into a corresponding data cache entry.

9. The method of claim 8, wherein the assigning occurs during an allocation stage of a pipeline.

10. The method of claim 8, wherein the load instructions are retired from a reorder buffer.

11. The method of claim 8, further comprising:
    determining that the transaction is to commit;
    committing the transaction;
    freeing the previously used physical registers associated with the transaction from the COW buffer; and
    clearing read-bits associated with the transaction from the data cache.

12. The method of claim 8, further comprising:
    determining that the transaction is to not commit;
    rolling back to a previous state using the physical registers associated with the transaction from the COW buffer;
    freeing the previously used physical registers associated with the transaction from the COW buffer; and
    clearing read-bits associated with the transaction from the data cache and any read-bits of cache lines that are younger than the transaction.

13. The method of claim 8, wherein the beginning of the transaction is indicated by an instruction.

14. The method of claim 8, wherein the end of the transaction is indicated by an instruction.

15. A method comprising:
    assigning a transactional memory (TM) region indicator to each instruction of a transaction;
    executing each instruction of the transaction;
    retiring one or more store instructions of the transaction from a store buffer until a last store instruction of an oldest TM region of a plurality of TM regions is retired and halting retirement of any other store instructions until the oldest TM region has committed; and setting a write-bit for each store instruction that has been retired into a corresponding entry of a data cache.

16. The method of claim 15, wherein the assigning occurs during an allocation stage of a pipeline.

17. The method of claim 15, further comprising:
determining that the transaction is to commit;
committing the transaction;
clearing write-bits associated with the transaction from the data cache.

18. The method of claim 15, further comprising:
determining that the transaction is to not commit;
rolling back to a previous state by discarding store instructions that were speculatively written into the data cache.

19. The method of claim 15, wherein the transaction is indicated by a beginning and an ending instruction.

* * * * *